United States Patent
Susuki et al.

[15] 3,691,120
[45] Sept. 12, 1972

[54] HOT-MELT ADHESIVE

[72] Inventors: Rinnosuke Susuki, Tokyo; Hiroshi Hoshi, Narashino; Jiro Saito; Minoru Okada, both of Tokyo, all of Japan

[73] Assignee: Lion Fat & Oil Co., Ltd., Tokyo, Japan

[22] Filed: Nov. 20, 1970

[21] Appl. No.: 91,534

[30] Foreign Application Priority Data

Nov. 25, 1969    Japan ..................... 44/93957

[52] U.S. Cl. ...... 260/27 EV, 260/28.5 AV, 260/41 R, 260/41 A
[51] Int. Cl. ........ C08d 9/12, C08c 11/70, C08f 45/04
[58] Field of Search..260/28.5 AV, 41 A, 41, 27 EV; 23/129

[56] References Cited

UNITED STATES PATENTS

| | | | |
|---|---|---|---|
| 2,269,608 | 1/1942 | Strieby | 23/129 |
| 2,375,786 | 5/1945 | Haywood | 23/129 |
| 3,061,577 | 10/1962 | Pruett | 260/41 A |
| 3,503,922 | 3/1970 | Carton | 260/41 A |
| 3,419,641 | 12/1968 | Peterkin et al. | 260/897 B |
| 3,573,240 | 3/1971 | Flanagan | 260/28.5 A |
| 3,577,372 | 4/1971 | Flanagan | 260/28.5 A |

OTHER PUBLICATIONS

Du Pont, Electrochemical Dept., Technical Information, PL 14– 865, 8/1965.
Skeist, Handbook of Adhesives, Reinhold Co., pages 189, 223 and 273 relied on.

*Primary Examiner*—Morris Liebman
*Assistant Examiner*—S. L. Fox
*Attorney*—Woodhams, Blanchard and Flynn

[57] ABSTRACT

A hot-melt adhesive having a superior adhesiveness at high temperature, comprising 100 parts by weight of a thermoplastic substance composed essentially of ethylene-vinyl acetate copolymer and 10–200 parts by weight of an inorganic filler.

7 Claims, No Drawings

HOT-MELT ADHESIVE

BACKGROUND OF THE INVENTION

1. Field of the Invention

The present invention relates to a hot-melt adhesive which demonstrates tackiness or adhesiveness only when subjected to heating, and more particularly, it relates to a hot-melt adhesive comprising a thermoplastic substance composed essentially of ethylene-vinyl acetate copolymer and a large quantity of an inorganic filler kneaded with said substance, whereby it is possessed of an improved adhesiveness at high temperature.

2. Description of the Prior Art

Polyolefin plastics such as polyethylene, polypropylene, etc. are so chemically stable and inactive that any conventional adhesive, solvent-type and pressure-sensitive type, can hardly display a satisfactory efficiency in bonding thereof. For the purpose of effecting the bonding of such polyolefin plastics, therefore, it is prevalent to employ a hot-melt adhesive of the same family as or similar to said plastics or a hot-melt adhesive comprising a copolymer of these plastics. Said hot-melt adhesive not only is quite suitable for the intended use but also has a variety of advantages such that, because of the thermoplasticity of the components thereof, the joint of the plastics bonded thereby is flexible and highly resistive to impact, and, if the occasion demands, even the plastics once bonded and solidified can be easily detached again by heating. On the other hand, however, it has such drawbacks that it is poor in the property of resisting thermal changes, so that, especially when subjected to a relatively high temperature, the joint of the plastics bonded thereby becomes softened, thereby causing the contact surfaces to slip with respect to each other or the plastics to come off.

With a view to making up for the foregoing drawbacks of the hot-melt adhesive, there has been proposed a method of adding a thermo-setting resin having a high thermal resistance, such as phenol resin, epoxy resin, etc., to said hot-melt adhesive. But, according to this method, provision of a sufficient thermal resistance for the hot-melt adhesive requires the employment of a large quantity of a thermo-setting plastic which is accompanied with the defect that the aforesaid various advantages characterizing the hot-melt adhesive come to be sacrificed thereto. Consequently, it has not been practical, and, besides, the friction pull strength thereof has proved insufficient.

There has also been practiced a means of making up for the foregoing defect mixing a small quantity of an inorganic substance such as calcium carbonate, clay, talc, white lead, etc. But, this means has proved unsatisfactory from the viewpoint of the friction pull strength.

SUMMARY OF THE INVENTION

The present invention is intended to eliminate the above-mentioned drawbacks in the prior art, and its object is to provide a hot-melt adhesive which is prepared without admixing any thermo-setting plastic, etc. and yet not only is possessed of a very stable adhesiveness almost invulnerable to a low temperature or a high temperature but also retains those various advantages peculiar to the hot-melt adhesive.

This object is achieved by mixing, through kneading, a large quantity of an inorganic filler with a thermoplastic substance composed essentially of an ethylene-vinyl acetate copolymer. The thermoplastic substance applicable to the present invention is a compound comprising an ethylene-vinyl acetate copolymer as the main component thereof together with such assistants as the fluidity improver, tackifier, etc. Mixing of the fluidity improver is for the purpose of improving the adhesiveness and controlling the fluidity of the adhesive. The fluidity improver applicable to the present invention includes, for instance, chlorinated paraffin, natural wax and synthetic wax. To give examples of the tackifier, there are refined rosin, ester gum, polyisobutylene, petroleum resin, cumarone resin, alkylphenol-formaldehyde resin, etc., and these can be applied either individually or by combining several of them appropriately. The above-mentioned inorganic filler functions not only to provide the adhesive with thermal resistance and burning resistance but also as a reinforcing agent. It includes such inorganic substances as calcium sulfite, magnesium silicate, silicon dioxide, etc., and these can be applied either individually or by combining several of them appropriately. Especially, calcium sulfite proves effective.

The adhesive according to the present invention is obtained by kneading the aforesaid inorganic filler with a thermoplastic substance prepared by mixing 100 parts by weight of an ethylene-vinyl acetate copolymer, 10–40 parts by weight of the fluidity improver and 30–200 parts by weight of the tackifier, at the rate of 10–200 parts by weight of the former per 100 parts by weight of the latter. (The optimum content of the inorganic filler is in the range of 20–40 parts by weight per 100 parts by weight of the thermoplastic substance.) In preparing this composition of the adhesive, in case the quantity of the fluidity improver mixed with 100 parts by weight of said ethylene-vinyl acetate copolymer exceeds 40 parts by weight, the resultant adhesive comes to have more fluidity than that required and its adhesiveness is impeded, while, in case said quantity is less than 10 parts by weight, mixing of the fluidity improver does not lead to any practical result. In case the quantity of the tackifier mixed in the composition is less than 30 parts by weight, the resultant adhesive is short of tackiness and fails to have a satisfactory adhesive property. Mixing of the tackifier in excess of 200 parts by weight is also undesirable as it will result in a defective adhesive. As for the quantity of the inorganic substance to be mixed with the thermoplastic substance, in case it is less than 10 parts by weight, it is infeasible to obtain the intended effect of the mixing, namely, thermal resistive strength of the thermoplastic substance, while, in case it exceeds 200 parts by weight, the thermoplastic substance develops a tendency of becoming fragile and comes to lack mechanical strength such as impact resistance, etc. The ethylene-vinyl acetate copolymer defined herein is not necessarily specified, but it is desirable that it contains vinyl acetate in the range of 5–95 Wt%, and preferably in the range of 10–50 Wt% as in the case of the product of the Du Pont's process of manufacturing high-pressure polyethylene copolymer.

In this connection, it is to be noted that the hot-melt adhesive according to the present invention is particularly effective when applied to polyolefine resins, and yet it works effectively on other thermoplastic resins, thermo-setting resins as well as various synthetic substances prepared by utilizing the foregoing resins, such as synthetic leather, synthetic paper, synthetic wood, etc.

In addition, it is also applicable to such natural manufactures as glass, metal goods, leather, paper goods, fiber, wood, stone, etc.

Upon preparing a test piece consisting of a couple of polyethylene pieces bonded with the adhesive of the present invention (which composition is shown in Example 1) on one hand and a comparative test piece consisting of the same polyethylene pieces as above bonded with an adhesive absolutely free of the inorganic filler, friction pull tests were conducted on both test pieces. The result were as shown in the following Table 1.

TABLE 1

Friction pull strength kg/25.4mm wide

| Test temperature | Adhesive containing 40 parts by weight of $CaSO_3$ | Adhesive free of inorganic filler |
|---|---|---|
| −20 °C | 6.6 | 7.0 |
| 40 °C | 3.4 | 0.43 |

As seen from the foregoing Table 1, the adhesive not containing the inorganic filler showed a remarkable deterioration of the adhesive strength thereof when the temperature rose above 20°C up to 40°C, while the present adhesive did not show so much deterioration of the adhesive strength and proved to have an excellent thermal resistance.

Further, by applying various rates of mixing the inorganic filler ($CaSO_3$), friction pull tests were conducted on the present adhesive at 20°C and 40°C. The results were as shown in the following Table 2.

TABLE 2

Friction pull strength kg/25.4mm wide

| $CaSO_3$ Content | 20°C | 40°C |
|---|---|---|
| 0 (part by weight) | 7.0 | 0.43 |
| 5 | 7.0 | 0.60 |
| 10 | 6.8 | 0.80 |
| 20 | 6.5 | 1.4 |
| 30 | 5.9 | 2.4 |
| 40 | 5.6 | 3.4 |
| 100 | 2.17 | 2.16 |
| 200 | 1.89 | 1.94 |

As seen from the foregoing Table 2, in case the temperature was comparatively low, gradual increase in quantity of the inorganic filler resulted in little changes in the friction pull strength of the present adhesive, while in case the temperature was comparatively high, said strength of the adhesive not containing the inorganic filler was remarkably poor, but it radically increased with the increase in quantity of said filler, thereby manifesting the effect of the inorganic filler mixed therein.

(Remark)

The above-mentioned quantity of $CaSO_3$ in terms of part by weight indicates the mixing rate of $CaSO_3$ calculated by regarding the total quantity of a mixture comprising 100 parts by weight of an ethylene-vinyl acetate copolymer, 120 parts by weight of a refined rosin and 30 parts by weight of a chlorinated paraffin as 100 parts by weight.

PREFERRED EMBODIMENT OF THE INVENTION

EXAMPLE 1

Composition:
| | |
|---|---|
| ethylene-vinyl acetate copolymer (trade name: EVAFLEX 150, manufactured by Mitsui Polychemical Co.) | 100 parts by weight |
| refined rosin | 120 parts by weight |
| chlorinated paraffin | 30 parts by weight |
| calcium sulfite | 100 parts by weight |
| age resister, etc. [2.6-di-tert-butyl-p-cresol (B.H.T), dioctyl phthalate (D.O.P.), white lead] | 20 parts by weight |

An adhesive according to the above composition was applied to one piece each of a couple of pieces of polyethylene tape, polypropylene tape, cotton cloth and cardboard, sized 25.4mm wide and 304.8mm long respectively. On the other hand, another adhesive prepared by omitting calcium sulfite from the same composition for the purpose of comparison was applied to the other piece of said polyethylene tape, polypropylene tape, cotton cloth and cardboard, respectively. Subsequently, all of these pieces were subjected to 180°-angle friction pull test at 40°C. Comparative results of the test were as shown in the following Table 3. In this connection, the friction pull strength is usually measured by stripping at the rate of 100 mm/min or thereabout, but, in the present example, the measurement was performed under a mare severe condition, namely, by stripping at the rate of 20 mm/min.

TABLE 3

Friction pull strength Kg(40°C)

| | Adhesive under the present invention | Comparative adhesive |
|---|---|---|
| polyethylene tape | 3.4 | 0.43 |
| polypropylene tape | 3.3 | 0.45 |
| cardboard | 3.6 | 0.52 |
| cotton cloth | 3.2 | 0.41 |

As seen from the foregoing Table 3, the present adhesive mixed with calcium sulfite displayed friction pull strength about 8–9 times as much as that of an adhesive free of calcium sulfite at a temperature of 40°C, proving the remarkable effect of the inorganic filler.

EXAMPLE 2

Composition:
| | |
|---|---|
| ethylene-vinyl acetate copolymer (trade name: EVAFLEX 220) | 100 parts by weight |
| refined rosin | 120 parts by weight |
| chlorinated paraffin | 30 parts by weight |
| magnesium silicate | 100 parts by weight |
| age resister, etc. (B.H.T., D.O.P., white lead) | 20 parts by weight |

COMPARATIVE EXAMPLE 1

Composition:
| | |
|---|---|
| ethylene-vinyl copolymer (trade name: EVAFLEX 150) | 100 parts by weight |
| refined rosin | 120 parts by weight |
| chlorinated paraffin | 30 parts by weight |
| calcium carbonate | 100 parts by weight |
| age resistor, etc. (B.H.T, D.O.P, white lead) | 20 parts by weight |

EXAMPLE 3

Composition:
| | |
|---|---|
| ethylene-vinyl acetate copolymer (trade name: EVAFLEX 150) | 100 parts by weight |
| ester gum (hydrogenated product) | 120 parts by weight |
| 130°F paraffin | 30 parts by weight |
| polyisobutylene | 15 parts by weight |
| age resister, etc. (B.H.T., D.O.P, white lead) | 20 parts by weight |
| calcium sulfite | 200 parts by weight |

EXAMPLE 4

Composition:
| | |
|---|---|
| ethylene-vinyl acetate (trade name: EVAFLEX 150) | 70 parts by weight |
| ester gum (non-hydrogenated product) | 120 parts by weight |
| 130°F paraffin | 30 parts by weight |
| polyisobutylene | 15 parts by weight |
| age resistor, etc. (B.H.T, D.O.P, white lead) | 20 parts by weight |
| silicon dioxide | 100 parts by weight |

EXAMPLE 5

Composition:
| | |
|---|---|
| ethylene-vinyl acetate copolymer (trade name: EVAFLEX 420) | 70 parts by weight |
| petroleum resin (trade name: "PETROSIN", manufactured by Mitsui Poly Chemical Co.) | 120 parts by weight |
| 130°F paraffin | 30 parts by weight |
| polyisobutylene | 15 parts by weight |
| (B.H.T, D.O.P, white lead) | |
| calcium sulfite | 100 parts by weight |

Upon changing the material to undergo the application of the adhesive with respect to the foregoing Examples 2, 3, 4 and 5 as well as Comparative Example 1 and by applying the same method of test as in Example 1, measurement of friction pull strength was conducted. The result was as shown in the following Table 4.

TABLE 4

| | Kind of Inorganic filler | Kind of material to undergo application of adhesive | Friction pull strength kg/25.4mm) 20°C | 40°C |
|---|---|---|---|---|
| Ex. 2 | magnesium silicate | polyethylene | 2.5 | 2.0 |
| Comparative Ex. 1 | calcium carbonate | polyethylene | 1.5 | 1.1 |
| Ex. 3 | calcium sulfite | polystyrene | 5.8 | 3.7 |
| Ex. 4 | silicon dioxide | polystyrene | 3.2 | 2.5 |
| Ex. 5 | calcium sulfite | cardboard | 4.3 | 2.8 |

As seen from the foregoing Table 4, the friction pull strength of an adhesive containing calcium sulfite, magnesium silicate or silicon dioxide at room temperature was less deteriorative compared with that containing calcium carbonate, and, even at a high temperature, it was fairly remarkable. Examples wherein thermosetting resin was employed:

COMPARATIVE EXAMPLE 2

Composition:
| | |
|---|---|
| ethylene-vinyl acetate copolymer (trade name: EVAFLEX 150) | 100 parts by weight |
| refined rosin | 120 parts by weight |
| chlorinated paraffin | 30 parts by weight |
| age resister, etc. | 20 parts by weight |
| (B.H.T, D.O.P, white lead) | |
| phenol resin (thermo-setting) | 100 parts by weight |
| toluene | 630 parts by weight |

An adhesive according to the above composition was applied to a polyethylene tape, and, after evaporating toluene, it was caused to adhere to said tape by means of thermal pressure. The friction pull strength was as shown in the following Table 5.

TABLE 5

| | Adhesive strength (kg/25.4mm wide) | |
|---|---|---|
| | 20°C | 40°C |
| Adhesive according to the composition in Comparative Example 2 | 0.5 | 0.5 |

As seen from the foregoing Table 5, in case of an adhesive containing a thermo-setting resin shows a remarkable deterioration of the strength at room temperature.

What we claim is:

1. A hot-melt adhesive composition, consisting essentially of a mixture:
   a. a thermoplastic substance consisting essentially of 100 parts by weight of ethylene-vinyl acetate copolymer, 10–40 parts by weight of a fluidity improver selected from the group consisting of chlorinated paraffin, natural wax, synthetic wax and mixtures thereof, and 30–200 parts by weight of tackifier selected from the group consisting of refined rosin, ester gum, polyisobutylene, petroleum resin, cumarone resin, alkylphenol-formaldehyde resin and mixtures thereof;
   b. an inorganic filler selected from the group consisting of calcium sulfite, magnesium silicate, silicon dioxide and mixtures thereof;
   said composition containing from 20–200 parts by weight of said filler (b) per 100 parts by weight of said thermoplastic substance (a).

2. An adhesive as defined in claim 1, wherein the quantity of said inorganic filler is in the range of 20–40 parts by weight.

3. An adhesive as defined in claim 1, wherein said inorganic filler is calcium sulfite.

4. An adhesive as defined in claim 1, wherein the weight ratio of ethylene to vinyl acetate in said ethylene-vinyl acetate copolymer is in the range of 95:5–5:95.

5. An adhesive as defined in claim 4, wherein the weight ratio of ethylene to vinyl acetate in said ethylene-vinyl acetate copolymer is in the range of 90:10–50:50.

6. An adhesive as defined in claim 1, wherein the content of said ethylene-vinyl acetate copolymer in said thermoplastic substance is in the range of 20–50 Wt%.

7. An adhesive as defined in claim 6, wherein the content of said ethylene-vinyl acetate copolymer in said thermoplastic substance is in the range of 25–45 Wt%.

* * * * *